United States Patent
Ahn

(10) Patent No.: US 8,970,798 B2
(45) Date of Patent: Mar. 3, 2015

(54) DISPLAY DEVICE AND METHOD OF MANUFACTURING THE SAME

(75) Inventor: Seon-Hong Ahn, Yongin (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 380 days.

(21) Appl. No.: 13/330,933

(22) Filed: Dec. 20, 2011

(65) Prior Publication Data

US 2013/0021561 A1   Jan. 24, 2013

(30) Foreign Application Priority Data

Jul. 19, 2011   (KR) .................. 10-2011-0071562

(51) Int. Cl.
| | | |
|---|---|---|
| G02F 1/1347 | (2006.01) | |
| G02F 1/1335 | (2006.01) | |
| H01J 1/63 | (2006.01) | |
| G02F 1/153 | (2006.01) | |
| G02B 27/22 | (2006.01) | |
| G02F 1/15 | (2006.01) | |

(52) U.S. Cl.
CPC ...... *G02F 1/133512* (2013.01); *G02B 27/2214* (2013.01); *G02F 1/15* (2013.01); *G02F 2201/44* (2013.01); *G02F 2203/62* (2013.01)
USPC .............. 349/15; 349/77; 349/96; 313/504; 359/265; 359/464; 445/25

(58) Field of Classification Search
CPC . G02F 1/133512; G02F 1/15; G02F 2203/62; G02F 2201/44; G02F 1/1347; G02F 1/13471; G02B 27/2214
USPC .......... 349/15, 74, 77, 96, 187; 359/265, 271, 359/273, 462, 464; 313/504; 445/25; 348/54
See application file for complete search history.

(56) References Cited

U.S. PATENT DOCUMENTS

| | | | |
|---|---|---|---|
| 7,750,981 B2 | 7/2010 | Shestak et al. | |
| 2004/0257531 A1* | 12/2004 | Hattori et al. | 353/10 |
| 2007/0047058 A1* | 3/2007 | Lim | 359/267 |
| 2008/0231767 A1* | 9/2008 | Lee | 349/15 |
| 2008/0259232 A1* | 10/2008 | Kim et al. | 349/15 |
| 2009/0147186 A1* | 6/2009 | Nakai et al. | 349/74 |
| 2010/0271346 A1* | 10/2010 | Ku et al. | 345/204 |

(Continued)

FOREIGN PATENT DOCUMENTS

| | | |
|---|---|---|
| KR | 10-2008-0064618 A | 7/2008 |
| KR | 10-2008-0086110 A | 9/2008 |
| KR | 10-2009-0114646 A | 11/2009 |

*Primary Examiner* — Dung Nguyen
*Assistant Examiner* — Tai Duong
(74) *Attorney, Agent, or Firm* — Lee & Morse, P.C.

(57) ABSTRACT

A display device includes: a first substrate; a second substrate on the first substrate and facing the first substrate, the second substrate having a first electrode on a surface thereof; a third substrate on the second substrate and facing the second substrate, the third substrate having a second electrode on a surface thereof, the second electrode facing the first electrode and configured to form an electric field between the first electrode and the second electrode; a barrier layer interposed between the second substrate and the third substrate, the barrier layer configured to selectively control transmission and blockage of light in regions thereof corresponding to each of a plurality of pixels; and a first polarizing plate on the third substrate and configured to transmit a portion of light passing through the barrier layer, the portion of light having a first phase, the barrier layer including electrochromic elements.

19 Claims, 12 Drawing Sheets

(56) References Cited

U.S. PATENT DOCUMENTS

| | | | |
|---|---|---|---|
| 2010/0271685 A1* | 10/2010 | Liu | 359/265 |
| 2011/0043713 A1* | 2/2011 | Nam et al. | 349/15 |
| 2012/0170115 A1* | 7/2012 | Zhang et al. | 359/465 |

* cited by examiner

DISPLAY DEVICE AND METHOD OF MANUFACTURING THE SAME

This application claims priority from Korean Patent Application No. 10-2011-0071562 filed on Jul. 19, 2011 in the Korean Intellectual Property Office, the disclosure of which is incorporated herein by reference in its entirety.

BACKGROUND OF THE INVENTION

1. Field of the Invention

Embodiments relate to a display device and a method of manufacturing the same.

2. Description of the Related Art

A display device displays an image by emitting light using various methods. A light emission method used by a display device often serves as a basis for determining the type of the display device. Various research is being competitively conducted on each light emission method in order to effectively control the luminance of emitted light and improve display quality.

Apart from research conducted to control the luminance of light, research into a stereoscopic image display device which displays a three-dimensional (3D) image by controlling an optical path has recently been drawing a lot of attention. Such a stereoscopic image display device is based on the principle that an observer perceives a stereoscopic image when a left image is input to the observer's left eye and a right image is input to the observer's right eye.

SUMMARY OF THE INVENTION

One or more embodiments may provide a display device including: a first substrate; a second substrate on the first substrate and facing the first substrate, the second substrate having a first electrode on a surface thereof; a third substrate on the second substrate and facing the second substrate, the third substrate having a second electrode on a surface thereof, the second electrode facing the first electrode and configured to form an electric field between the first electrode and the second electrode; a barrier layer interposed between the second substrate and the third substrate, the barrier layer being configured to selectively control transmission and blockage of light in regions thereof corresponding to each of a plurality of pixels; and a first polarizing plate on the third substrate, the first polarizing plate configured to transmit a portion of light passing through the barrier layer, the portion of light having a first phase, the barrier layer including electrochromic elements configured to become colorless or black by the electric field.

A first liquid crystal layer may be provided between the first substrate and the second substrate, and a second polarizing plate may be disposed under the first substrate and configured to transmit a portion of light emitted from a light source, the portion of light having a second phase. An organic light-emitting layer may be between the first substrate and the second substrate.

The barrier layer may include first chromic elements, the first chromic elements may be configured to become colorless due to the electric field, and second chromic elements, the second chromic elements may be configured to become black due to the electric field, the first and second chromic elements may be arranged alternately in a matrix. The barrier layer may include first regions and second regions, the first and second regions being arranged alternately in a matrix, and the first electrode and the second electrode being at positions corresponding to the first regions to selectively change the color of electrochromic elements in the first regions. The first regions may become black.

The electrochromic elements may include a functional group-containing polymer compound, wherein the functional group may includes one or more of perfluorocyclobutan, a hydroxyl group, an amino group, an alkyl amino group, an aryl amino group, a heteroaryl amino group, a cyano group, an alkyl group, a cycloalkyl group, an alkoxy group, an aryl group, an aryl alkyl group, a heteroaryl group, and a heterocyclic group. A configuration of the barrier layer in a first mode, in which incident light is transmitted, is different from a second mode, in which part of incident light is blocked.

One or more embodiments may provide a display device including a first substrate; a first polarizing plate on the first substrate and configured to transmit light having a first phase; a second substrate on the first polarizing plate and facing the first substrate, the second substrate having a first electrode on a surface thereof; a third substrate on the second substrate and facing the second substrate, the third substrate having a second electrode facing the first electrode and configured to form an electric field between the first electrode and the second electrode; and a barrier layer interposed between the second substrate and the third substrate, the barrier layer configured to selectively control transmission and blockage of light emitted from a plurality of pixels on the first substrate. A first liquid crystal layer may be between the first substrate and the second substrate and a second polarizing plate may be under the first substrate and configured to transmit a portion of light emitted from a light source, the portion of light having a second phase.

An organic light-emitting layer may be between the first substrate and the second substrate. The first polarizing plate may be in a region corresponding to the pixels on the first substrate. The first polarizing plate may be integrally attached to a surface of the second substrate. The barrier layer may include a second liquid crystal layer, the second liquid crystal layer may be driven by the electric field. A third polarizing plate may be disposed on the third substrate, the third polarizing plate being configured to transmit light a portion of light passing through the barrier layer, the portion of light having a third phase. The barrier layer may further include electrochromic elements, the electrochromic elements configured to become colorless or black due to the electric field. The electrochromic elements may include a functional group-containing polymer compound, wherein the functional group includes one or more of perfluorocyclobutan, a hydroxyl group, an amino group, an alkyl amino group, an aryl amino group, a heteroaryl amino group, a cyano group, an alkyl group, a cycloalkyl group, an alkoxy group, an aryl group, an aryl alkyl group, a heteroaryl group, and a heterocyclic group. A configuration of the barrier layer in a first mode, in which incident light is transmitted, may be different from a second mode, in which part of incident light is blocked.

One or more embodiments may provide a method of manufacturing a display device, the method including: providing a first substrate; forming a plurality of pixels, on the first substrate, each of the plurality of pixels including a pixel electrode; providing a second substrate which faces the first substrate; laminating the first substrate and a first surface of the second substrate; forming a first electrode on a second surface of the second substrate; providing a third substrate which faces the second substrate and has a second electrode formed on a surface, the second electrode facing the first electrode; providing a barrier layer between the second substrate and the third substrate, the barrier layer including electrochromic elements which become colorless or black due to the electric field; and laminating the second surface of the second substrate and a surface of the third substrate. The barrier layer may include first regions and second regions, the first and second regions being arranged alternately in a matrix, and the first electrode and the second electrode being formed at positions corresponding to the first regions to selectively change the color of electrochromic elements in the first regions of the barrier layer. The first regions may become black.

BRIEF DESCRIPTION OF THE DRAWINGS

The above and other aspects and features of the embodiments will become more apparent by describing in detail exemplary embodiments thereof with reference to the attached drawings, in which.

DETAILED DESCRIPTION OF THE INVENTION

Figure 1:
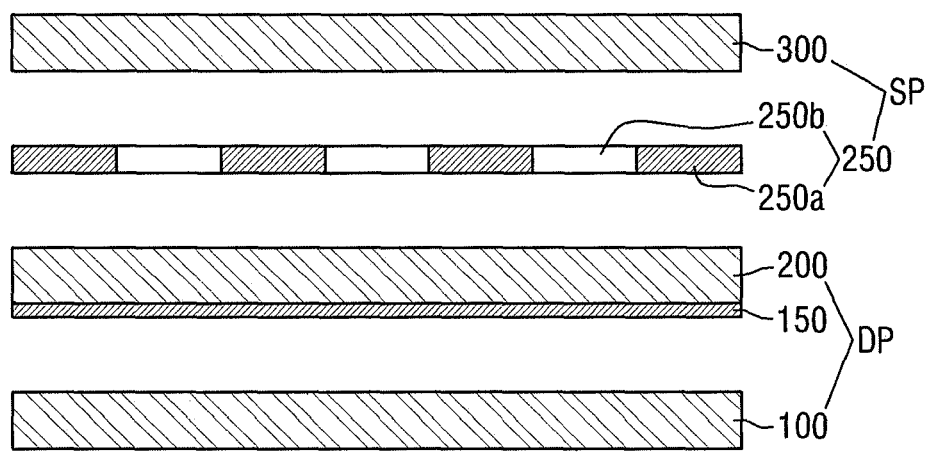
FIG. 1 illustrates a cross-sectional view showing the configuration of a display device according to an embodiment.

Embodiments will now be described more fully hereinafter with reference to the accompanying drawings, in which preferred embodiments are shown. Embodiments may, however, be embodied in different forms and should not be construed as limited to the embodiments set forth herein. Rather, these embodiments are provided so that this disclosure will be thorough and complete, and will fully convey the scope of the embodiments to those skilled in the art. The same reference numbers indicate the same components throughout the specification. In the attached figures, the thickness of layers and regions is exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this invention belongs. It is noted that the use of any and all examples, or exemplary terms provided herein is intended merely to better illuminate the invention and is not a limitation on the scope of the invention unless otherwise specified. Further, unless defined otherwise, all terms defined in generally used dictionaries may not be overly interpreted.

Embodiments will be described with reference to perspective views, cross-sectional views, and/or plan views, in which preferred embodiments are shown. Thus, the profile of an exemplary view may be modified according to manufacturing techniques and/or allowances. That is, the embodiments described are not intended to limit the scope of the embodiments but cover all changes and modifications that can be caused due to a change in manufacturing process. Thus, regions shown in the drawings are illustrated in schematic form and the shapes of the regions are presented simply by way of illustration and not as a limitation.

Hereinafter, embodiments will be described with reference to the attached drawings.

FIG. 1 illustrates a cross-sectional view of the configuration of a display device according to an embodiment. Referring to FIG. 1, the display device includes a display panel DP and a switching panel SP.

To form an image, each pixel of the display panel DP may generate light and provide the generated light to the switching panel SP. The switching panel SP may selectively transmit or block light generated from right-eye pixels and light generated from left-eye pixels, causing an observer to perceive a virtual three-dimensional (3D) stereoscopic image.

As will be described later, a barrier layer 250 of the switching panel SP may include barriers 250a which block light and slits 250b which transmit light. The barriers 250a and the slits 250b may be arranged at predetermined intervals or may be arranged alternately. In addition, the barriers 250a and the slits 250b may be arranged to correspond to the pixels of the display panel DP. For example, one barrier 250a and one slit 250b may correspond to one pixel, or a plurality of barriers 250a and a plurality of slits 250b may be formed within a width of one pixel. Conversely, one barrier 250a and one slit 250b may be formed within a total width of a plurality of pixels. The positional relationship between the barriers 250a and the slits 250b and the pixels may depend on an image to be displayed.

The switching panel SP may switch to a first mode SP_1 or a second mode SP_2. Accordingly, the switching panel SP may transmit all light to display a 2D image or selectively transmit and block light to display a 3D image. Such a switch between the first mode SP_1 and the second mode SP_2 is possible because the configuration of the barrier layer 250 may be changed by an electric field formed by a voltage applied to the barrier layer 250 of the switching panel SP. For example, when no electric field is applied to the barrier layer 250, the barriers 250a may not be formed in the barrier layer 250. Instead, only the slits 250b may be formed in the barrier layer 250. Accordingly, the switching panel SP may be set to the first mode SP_1 and thus transmit all light. When an electric field is applied to the barrier layer 250, the barriers 250a may be formed in part of the barrier layer 250. Accordingly, the switching panel SP may be set to the second mode SP_2 and, thus, selectively transmit light.

The display panel DP may include a first substrate 100, a first polarizing plate 150, and a second substrate 200. The switching panel SP may include the barrier layer 250 and a third substrate 300. For example, the switching panel SP may include only one substrate. In some embodiments, the display panel DP and the switching panel SP may share the second substrate 200, thereby reducing the number of substrates required. This configuration enables the provision of a thin display device which may perform the same 2D/3D image display function as that of a conventional 2D/3D image display device.

In some embodiments, the display panel DP may be a self-luminous display panel such as an organic light-emitting diode (OLED) display panel, a light-emitting diode (LED) display panel, an inorganic electroluminescent (EL) display panel, a field emission display (FED) panel, a surface-conduction electron-emitter display (SED) panel, a plasma display panel (PDP), or a cathode ray tube (CRT) display panel.

In some other embodiments, the display panel DP may be a non-luminous display panel such as a liquid crystal display (LCD) panel or an electrophoretic display (EPD) panel. When the display panel DP is a non-luminous display panel, a light source such as a backlight assembly may further be provided behind the display panel DP.

The display device according to the current embodiment may include the first substrate 100, the first polarizing plate 150, which may be formed on the first substrate 100 and may transmit light having a first phase, the second substrate 200, which may be foamed on the first polarizing plate 150, have a first electrode 210 (see FIG. 5) formed on a surface thereof, and face the first substrate 100, the third substrate 300, which may face the second substrate 200 and have a second electrode 290 (see FIG. 5) facing the first electrode 210 and forming an electric field, and the barrier layer 250, which may be interposed between the second substrate 200 and the third substrate 300 and selectively control the transmission and blockage of light emitted from the pixels.

Each of the first through third substrates 100 through 300 may include a transparent glass material including $SiO_2$ as a main component. Alternatively, each of the first through third substrates 100 through 300 may include transparent plastic. Examples of the plastic material may include polyethersulphone (PES), polyacrylate (PAR), polyetherimide (PEI), polyethylene napthalate (PEN), polyethylene terephthalate (PET), polyphenylene sulfide (PPS), polyallylate, polyimide, polycarbonate (PC), cellulose triacetate (TAC), cellulose acetate propionate (CAP), or a combination of one or more of these materials.

A plurality of pixels may be formed on a surface of the first substrate 100. One or more thin-film transistors (TFTs) and/or one or more capacitors may be placed in each of the pixels. Elements formed on a surface or both surfaces of the first substrate 100 may vary according to the type of the display panel DP, which will be described in detail later with reference to FIGS. 2 and 3.

The first polarizing plate 150 may formed on the first substrate 100 and may selectively transmit light having the first phase. For example, the first polarizing plate 150 may transmit S-polarized light only and block or reflect P-polarized light. The first polarizing plate 150 may be interposed between the display panel DP and the switching panel SP. As such, the first polarizing plate 150 may selectively provide light having a predetermined phase to the switching panel SP, from among light emitted from the pixels of the display panel DP.

The second substrate 200 may be disposed on the first polarizing plate 150 and may form the display panel DP together with the first substrate 100. The first polarizing plate 150 may be attached to a surface of the second substrate 200. As will be described later, the first electrode 210 (see FIG. 5) may be formed on the other surface of the second substrate 200, e.g., surface opposed to surface on which first polarizing plate 150 is attached, to form an electric field in the switching panel SP.

The barrier layer 250 may be disposed on the second substrate 200. The barrier layer 250 may include the slits 250b, which transmit light, and the barriers 250a, which block light. As such, the barrier layer 250 may selectively control the transmission and blockage of light emitted from the pixels on the first substrate 100. The barrier layer 250 may control light that is to enter a right eye and light that is to enter a left eye, thereby creating parallax information. The parallax information may enable an observer to perceive 3D stereoscopic images.

An electric field formed by an electrode on the second substrate 200 and an electrode formed on the third substrate 300 may change the configuration of the barrier layer 250 and the arrangement of the barriers 250a and the slits 250b, which, in turn, may switch the switching panel SP to the first mode SP_1 or the second mode SP_2. Accordingly, 2D or 3D images may be selectively displayed.

The third substrate 300 may be disposed on the barrier layer 250. The third substrate 300 may receive light that is to enter the right eye or the left eye from the barrier layer 250 and pass the received light therethrough. In some embodiments, the second substrate 200 may form or be part of the switching panel SP together with the third substrate 300.

Figure 2:
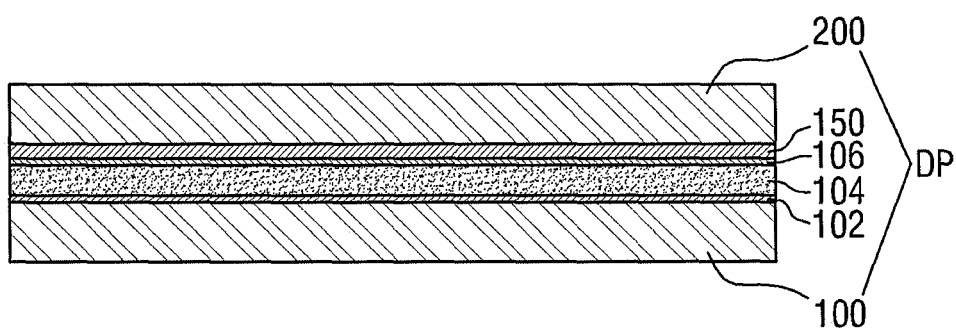
FIG. 2 illustrates a cross-sectional view showing an example configuration of a display panel of FIG. 1.

FIG. 2 illustrates a cross-sectional view of an exemplary configuration of the display panel DP of FIG. 1. As described above, the display panel DP may be an OLED display panel of FIG. 2.

Referring to FIG. 2, the first substrate 100 may be provided in a lower part of the display panel DP. As described above, the first substrate 100 may include a transparent glass material including $SiO_2$ as a main component. Alternatively, the first substrate 100 may include transparent plastic or an insulating organic material.

Although not shown in the drawing, typical elements of an organic light-emitting display device may be formed on the first substrate 100, such as a buffer layer, which planarizes the first substrate 100 and prevents the penetration of impurities into the first substrate 100, a semiconductor layer, a gate electrode and source/drain electrodes, which may form a TFT and/or a capacitor. Additionally, a plurality of gate insulating films and an interlayer insulating film may be stacked on the first substrate 100. These elements may form one or more TFTs and one or more capacitors.

A pixel electrode 102 may be formed on the first substrate 100. The pixel electrode 102 may be connected to a drain electrode of a TFT so as to receive a driving voltage. In a bottom emission organic light-emitting display device, the pixel electrode 102 may be a transparent conductive material such as indium tin oxide (ITO) or indium zinc oxide (IZO). However, in a top emission organic light-emitting display device, the pixel electrode 102 may not necessarily be a transparent conductive material.

An organic layer 104 may be formed on the pixel electrode 102. The organic layer 104 according to the current embodiment may be formed by sequentially stacking a hole injecting layer, a hole transporting layer, an emitting layer, an electron transporting layer, and an electron injecting layer. However, embodiments are not limited thereto. One or more layers may be added or removed.

Holes injected from the hole injecting layer and electrons injected from the electron injecting layer may combine together in the emitting layer to generate light.

A cathode electrode 106 may be disposed on the organic layer 104 and may form an electric field together with the pixel electrode 102 thereunder, such that the organic layer 104 may emit light. The cathode electrode 106 of the OLED display panel DP according to the current embodiment may be made of a material that transmits light. A common voltage may be applied to the cathode electrode 106.

Although not shown in the drawing, an additional element such as an organic capping film may be formed on the cathode electrode 106 in some embodiments.

Figure 3:
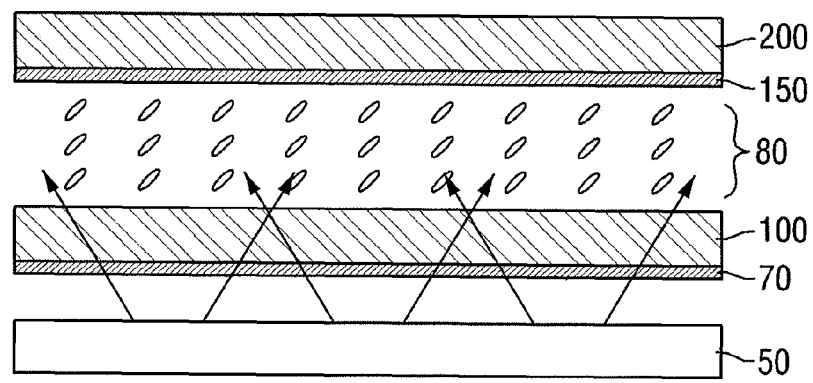
FIG. 3 illustrates a cross-sectional view showing another example configuration of the display panel of FIG. 1.

FIG. 3 illustrates a cross-sectional view showing another exemplary configuration of the display panel DP of FIG. 1. As described above, the display panel DP may be an LCD panel of FIG. 3.

Referring to FIG. 3, the display panel DP may include a backlight assembly 50, which includes a plurality of light sources, under the first substrate 100. The backlight assembly 50 may include a reflective plate, a light guide plate, and one or more optical sheets in addition to the light sources. A second polarizing plate 70 may be provided between the backlight assembly 50 and the first substrate 100, and a liquid crystal layer 80 may be provided between the first substrate 100 and the second substrate 200.

Although not shown in the drawing, a plurality of pixels may be formed on the first substrate 100. In each of the pixels, a plurality of electrodes and a semiconductor layer or an insulating film may be provided to form one or more TFTs and one or more capacitors. The TFTs and the capacitors may control the driving of liquid crystals of the liquid crystal layer 80 which are located on each pixel region and may change the phase of light. The light having the changed phase may be transmitted through or blocked by the first polarizing plate 150. Therefore, light having a predetermined phase only may selectively be incident on the switching panel SP.

The second polarizing plate 70 may transmit light having a predetermined phase from among light emitted from the backlight assembly 50, such that the light having the predetermined phase is incident on the liquid crystal layer 80.

The second polarizing plate 70 may be a sheet elongated in a predetermined direction and may include polyvinyl alcohol (PVA). If the second polarizing plate 70 includes PVA, light that fails to pass through the second polarizing plate 70 may be absorbed by the second polarizing plate 70.

In some embodiments, the second polarizing plate 70 may contain cholesteric liquid crystals to increase retransmittance by reflecting light having a predetermined phase instead of absorbing the light, thereby increasing overall luminance.

In some embodiments, the first polarizing plate 150 and/or a third polarizing plate 350 (see FIG. 5) may include the same material as the second polarizing plate 70.

Rays of light input to the liquid crystal layer 80 may have the same phase. As the rays of light pass through liquid crystal particles, their phases may change according to a tilt angle of the liquid crystal particles. Accordingly, some of the rays of light may be blocked by the first polarizing plate 150 while the other rays pass through the first polarizing plate 150.

An electrode for forming an electric field that drives the liquid crystal particles may be formed on the first substrate 100 and/or the second substrate 200. As described above, a TFT of each pixel may control a voltage applied to the pixel electrode 102, thereby controlling an image for each pixel.

Figure 4A:
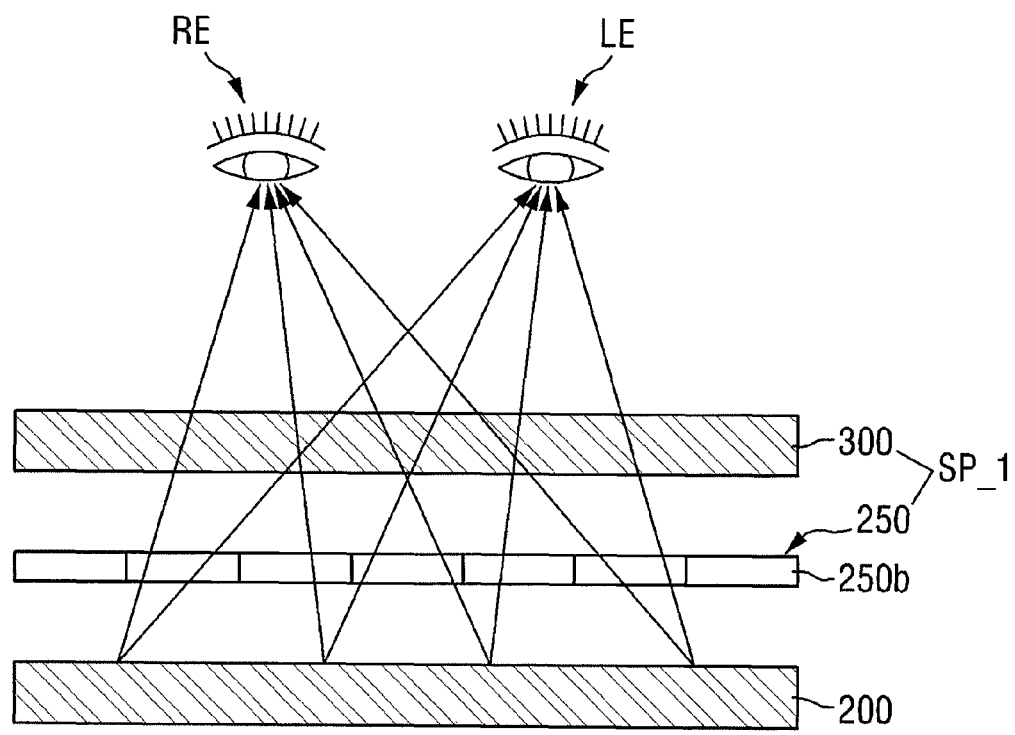
FIG. 4A illustrates a cross-sectional view showing the configuration of a switching panel of FIG. 1 in a first mode.
Figure 4B:
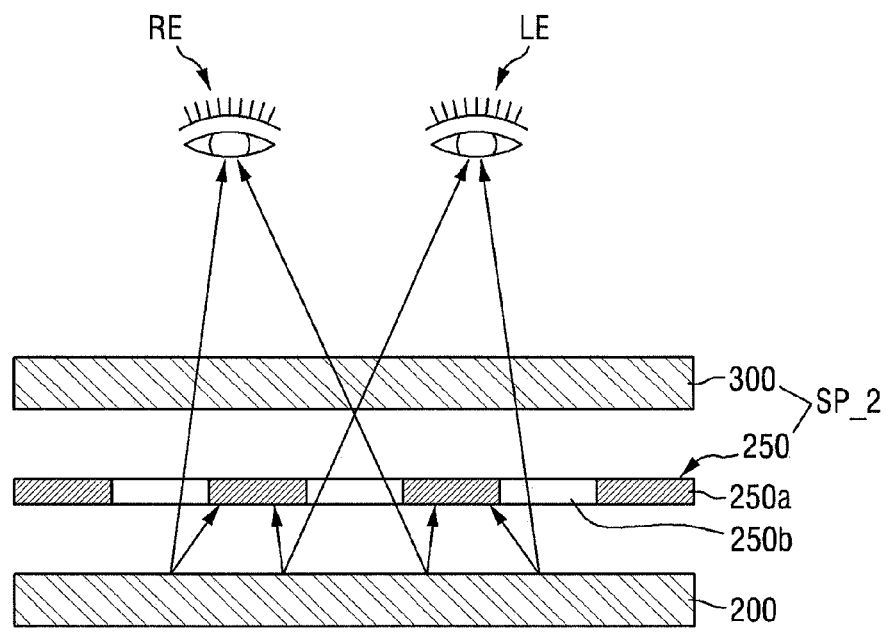
FIG. 4B illustrates a cross-sectional view showing the configuration of the switching panel of FIG. 1 in a second mode.

FIG. 4A illustrates a cross-sectional view of the configuration of the switching panel SP of FIG. 1 in the first mode SP_1. FIG. 4B illustrates a cross-sectional view of the configuration of the switching panel SP of FIG. 1 in the second mode SP_2.

Light that is generated from the above-described display panel DP or light that is transmitted through the display panel DP may be incident on the switching panel SP via the second substrate 200. The switching panel SP may include the third substrate 300 and the barrier layer 250 disposed on a surface of the third substrate, e.g., under the third substrate 300. As described above, in some embodiments, the switching panel SP may include the second substrate 200, the third substrate 300, and the barrier layer 250 located between the second substrate 200 and the third substrate 300.

The arrangement of the barriers 250a and the slits 250b of the barrier layer 250 may be changed to transmit light or selectively block light, thereby providing a 2D or 3D image to an observer. The arrangement of the barriers 250a and the slits 250b may be changed by, for example, adjusting an electric field applied to the barrier layer 250, a specific method of which will be described later with reference to FIGS. 5 and 6.

An exemplary method of forming a 2D image and a 3D stereoscopic image using the barrier layer 250 will now be described with reference to FIGS. 4A and 4B. Referring to FIG. 4A, in the first mode SP_1, only the slits 250b are formed in the barrier layer 250. Thus, the barrier layer 250 may allow all light to pass therethrough. In this case, the same image without parallax may be input to a left eye LE and a right eye RE. Accordingly, an observer may perceive a 2D image.

On the other hand, referring to FIG. 4B, in the second mode SP_2, the barriers 250a and the slits 250b of the barrier layer 250 may be arranged alternately. From light emitted from the backlight assembly 50, light travelling toward the left eye LE of the observer may pass through the left-eye pixels of the display panel DP and then through the slits 250b of the barrier layer 250 to reach the left eye LE of the observer. However, from the light that is emitted from the backlight assembly 50, light that passes through the left-eye pixels of the display panel DP and then travels toward the right eye RE of the observer may be blocked by the barriers 250a, and may fail to reach the observer. In the same way, part of the light emitted from the backlight assembly 50 may pass through the right-eye pixels of the display panel DP and then through the slits 250b of the barrier layer 250 to reach the right eye RE of the observer. Light that passes through the right-eye pixels of the display panel DP and then travels toward the left eye LE of the observer may be blocked by the barriers 250a.

As a result, light that passes through the left-eye pixels may be delivered only to the left eye LE of the observer, and light that passes through the right-eye pixels may be delivered only to the right eye RE of the observer. This may cause the left eye LE and the right eye RE of the observer to perceive different images. Accordingly, parallax information fully perceivable by the observer (i.e., a human) may be formed between light that reaches the left eye LE and light that reaches the right eye RE. The observer may, thereby, see 3D stereoscopic images.

In some embodiments, the barriers 250a of the barrier layer 250 may delay or change the phase of light, and then a polarizing plate placed ahead in the propagation direction of light may block the light having the changed phase. Alternatively, a liquid crystal layer may form a physical lens and control light to be incident on the left eye or the right eye by refracting the light.

As described above, the configuration of the barrier layer 250 according to the current embodiment may be different when the switching panel SP is in the first mode SP_1 and when in the second mode SP_2. 2D or 3D images can be displayed according to the mode of the switching panel SP.

Figure 5:
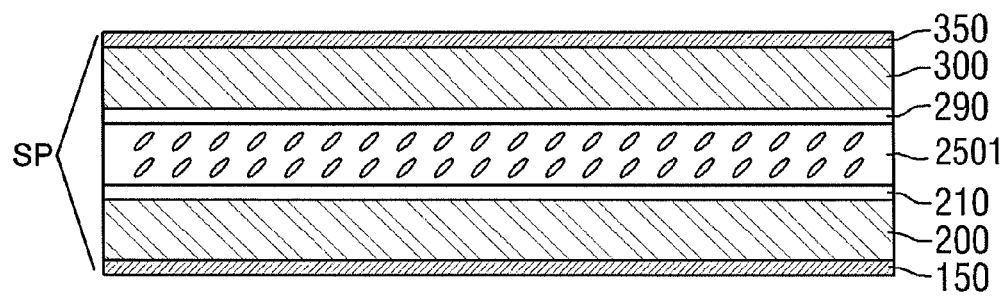
FIG. 5 illustrates a cross-sectional view showing an example configuration of the switching panel of FIG. 1.

A more detailed configuration of the switching panel SP will now be described with reference to FIGS. 5 and 6. FIG. 5 illustrates a cross-sectional view of an exemplary configuration of the switching panel SP of FIG. 1. In FIG. 5, a liquid crystal barrier layer 2501 may be employed as the barrier layer 250.

Referring to FIG. 5, the switching panel SP may include the second substrate 200, the first electrode 210, the liquid crystal barrier layer 2501 having a plurality of liquid crystal particles, the second electrode 290, and the third substrate 300. The switching panel SP may further include a third polarizing plate 350 formed on the third substrate 300 to block light having a third phase according to the phase of light. The third phase may be different from both the first phase and the second phase.

Each of the first electrode 210 and the second electrode 290 may include a transparent conductive material. For example, each of the first electrode 210 and the second electrode 290 may include an oxide such as ITO, IZO, zinc oxide (ZO), indium tin (JO), or titanium oxide (TiO). In another example, each of the first electrode 210 and the second electrode 290 may include a material such as carbon nanotubes (CNTs), metal nanowires, or conductive polymer. The first electrode 210 and the second electrode 290 may not necessarily include the same material.

In FIG. 5, each of the first electrode 210 and the second electrode 290 may be a whole-surface electrode. However, embodiments are not limited thereto. The first electrode 210 and/or the second electrode 290 may be patterned along the pixels and, thereby, be physically split into a plurality of sections to which different voltages may be applied. When different voltages are applied to the sections, a different electric field may be formed in each section, resulting in a different tilt angle of the liquid crystal particles in each section, which, in turn, may lead to differences in the transmittance of light in each section. This configuration may allow the liquid crystal particles of the liquid crystal barrier layer 2501 to play the role of a physical lens, such as a concave lens or a convex lens.

The liquid crystal barrier layer 2501 may at least partially modulate characteristics (such as the path or phase) of incident light. In some embodiments, the liquid crystal barrier layer 2501 may modulate characteristics of light differently according to mode. For example, the liquid crystal barrier layer 2501 may not modulate characteristics of light when the switching panel SP is in the first mode SP_1 but may modulate characteristics of light when the switching panel SP is in the second mode SP_2. Modulating light characteristics differently according to mode may enable modulating an image output from the display panel DP differently according to mode. Accordingly, the output image may be controlled differently according to mode by the liquid crystal barrier layer 2501. Such selective modulation of light characteristics according to mode by the liquid crystal barrier layer 2501 may make it possible to realize a 2D/3D switchable display, as described above.

More specifically, a first voltage may be applied to the first electrode 210 formed on a surface of the second substrate 200, and a second voltage may be applied to the second electrode 290 formed on a surface of the third substrate 300. Therefore, an electric field corresponding to a difference between the first voltage and the second voltage may be formed between a top surface of the first electrode 210 and a bottom surface of the second electrode 290. The liquid crystal particles included in the liquid crystal barrier layer 2501 may change the phase of light due to the electric field formed by the first electrode 210 and the second electrode 290. Since light that passes through the liquid crystal particles of the liquid crystal barrier layer 2501 may be transmitted through or blocked by the third polarizing plate 350 according to the phase thereof, the first electrode 210, the second electrode 290, the liquid crystal barrier layer 2501 having the liquid crystal particles, and the third polarizing plate 350 may combine to perform the same function as a physical barrier and/or slit function.

In some embodiments, the liquid crystal barrier layer 2501 may include a dielectric layer in addition to a liquid crystal layer to form a liquid crystal lens.

Another configuration of the switching panel SP will now be described. FIG. 6 illustrates a cross-sectional view of another exemplary configuration of the switching panel SP of FIG. 1.

Figure 6:
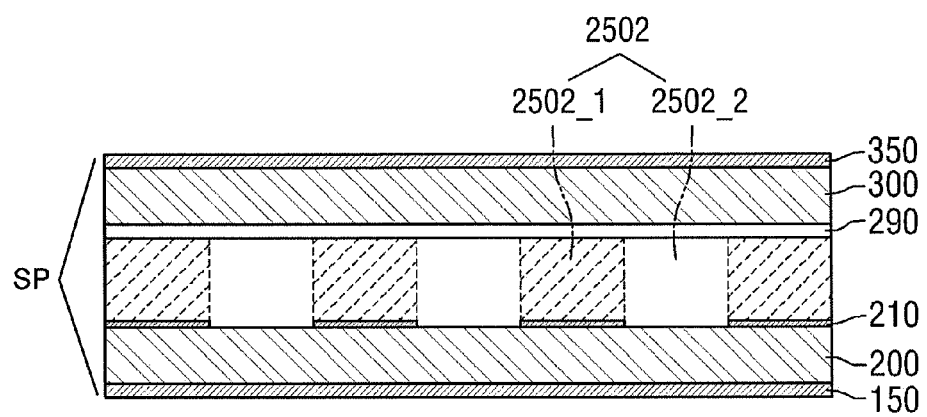
FIG. 6 illustrates a cross-sectional view showing another example configuration of the switching panel of FIG. 1.

Referring to FIG. 6, the switching panel SP may include the second substrate 200, the first electrode 210, a chromic barrier layer 2502 having electrochromic elements, the second electrode 290, and the third substrate 300. In this case, the electrochromic elements included in the chromic barrier layer 2502 may physically block light instead of changing the phase of light due to an electric field. Therefore, the third polarizing plate 350 formed on the chromic barrier layer 2502, or the third substrate 300, for blocking light according to the phase of the light, may be omitted.

Light characteristics of a material that forms the electrochromic elements may be reversibly changed by an electrochemical oxidation and reduction reaction. For example, the electrochromic elements may not display colors when no electric field is applied thereto and may display colors when an electric field is applied thereto. Conversely, the electrochromic elements may display colors when no electric field is applied thereto, and their colors may disappear when an electric field is applied thereto.

An electrochromic material of the chromic barrier layer 2502 may be any material that becomes colorless or black due to an electric field formed by the first electrode 210 and the second electrode 290. Applicable examples of the electrochromic material may include a viologen group-containing compound and a functional group-containing polymer compound. The functional group may include one or more of perfluorocyclobutan, a hydroxyl group, an amino group, an alkyl amino group, an aryl amino group, a heteroaryl amino group, a cyano group, an alkyl group, a cycloalkyl group, an alkoxy group, an aryl group, an aryl alkyl group, a heteroaryl group, and a heterocyclic group.

For example, an electrochromic element located in a region in which an electric field is formed among a plurality of regions of the chromic barrier layer 2502 may change from colorless to black, thus blocking light. On the other hand, an electrochromic element located in a region in which no electric field is formed may remain colorless, thus transmitting light. That is, the chromic barrier layer 2502 may include first regions 2502_1 and second regions 2502_2. The first and second regions 2502_1 and 2502_2 may be arranged alternately in a matrix form, and the first and second electrodes 210 and 290 may be formed only at positions corresponding to the first or second regions 2502_1 or 2502_2 to selectively change the color of electrochromic elements located in the first or second regions 2502_1 or 2502_2. Thus, the first and second regions 2502_1 and 2502_2 may form barriers and slits, respectively. For example, when the first regions 2502_1 become black, they may form barriers to block light. On the other hand, the second regions 2502_2 may remain colorless (transparent) to transmit light.

The chromic barrier layer 2502 may include a mixture of first chromic elements which become colorless due to an electric field and second chromic elements which become black due to the electric field. In addition, the chromic barrier layer 2502 may be physically divided into a plurality of regions, and the first chromic elements and the second chromic elements may be arranged alternately in the regions.

In FIG. 6, the first electrode 210 may be patterned along the first regions 2502_1, and the second regions 2502_2 may not be patterned. The first electrode 210 may consist of a plurality of physically separate electrodes, and a different voltage may be applied to each of the separate electrodes. For example, the first voltage may be applied to the first electrode 210, which may be located at a position corresponding to each of the first regions 2502_1, and the second voltage may be applied to the second electrode 290, which may be located at a position corresponding to each of the second regions 25022. In some embodiments, the first electrode 210 may not be patterned, and the same voltage may be applied to the entire first electrode 210. On the other hand, the second electrode 290 may be patterned, and different voltages may be applied to sections of the second electrode 290, which may be located at positions corresponding to the first and second regions 2502_1 and 2502_2. In some embodiments, both the first electrode 210 and the second electrode 290 may be patterned.

Figure 7:
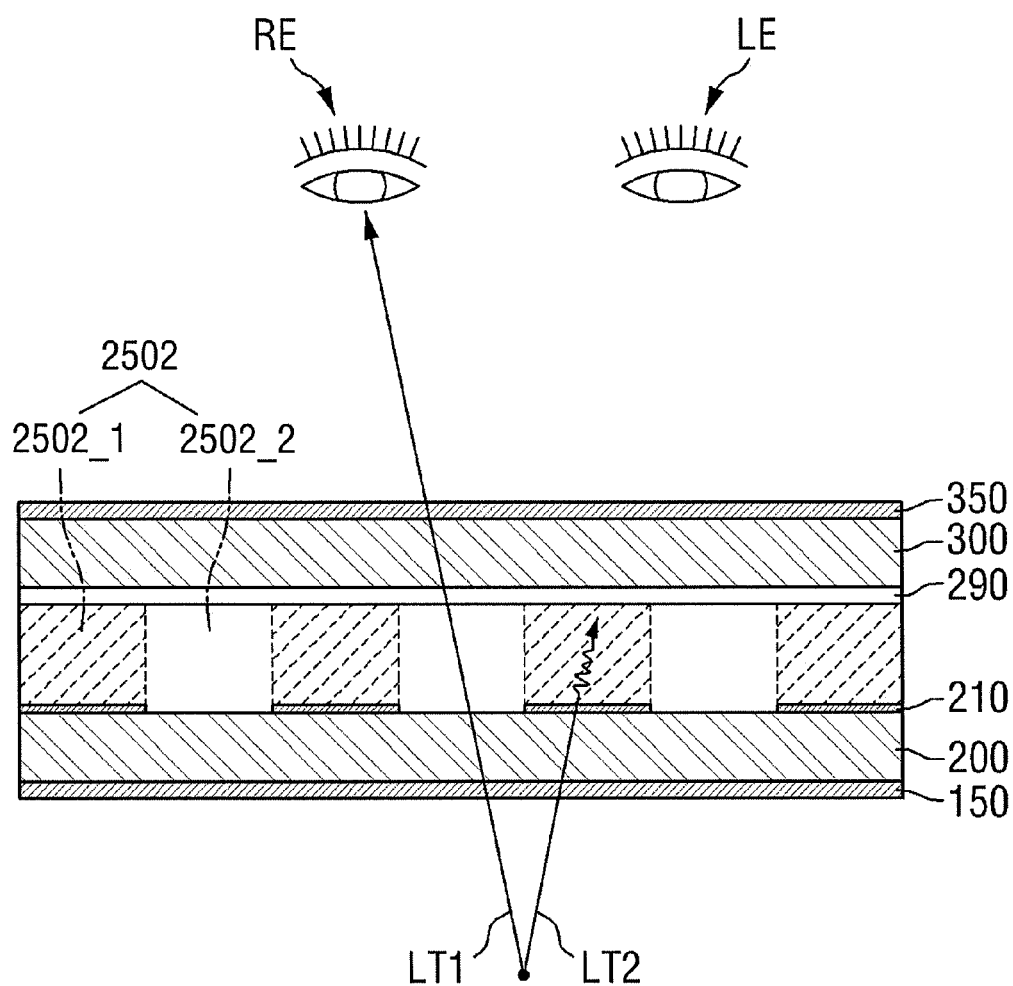
FIG. 7 illustrates a view schematically showing the light transmission structure of a barrier layer of FIG. 6.

FIG. 7 illustrates a view schematically showing the light transmission structure of the chromic barrier layer 2502 of FIG. 6. Referring to FIG. 7, the chromic barrier layer 2502, including the electrochromic elements, may be divided into the first regions 2502_1 and the second regions 2505_2 corresponding to the patterned first and second electrodes 210 and 290, respectively.

An electric field may be formed in each of the first regions 2502_1 between the first electrode 210 and the second electrode 290 and may not be formed in each of the second regions 2505_2.

In a case where the transparent electrochromic elements that form the chromic barrier layer 2502 become black when an electric field is applied thereto, the first regions 2502_1 may function as the barriers 250a which do not transmit light, and the second regions 25022 may function as the slits 250b which transmit light.

Therefore, when right-eye light is provided by the display panel DP, as shown in FIG. 7, the first regions 2502_1 of the chromic barrier layer 2502 may block the left-eye light, thus preventing it from reaching the left eye LE. On the other hand, the second regions 2502_2 may allow the left-eye light to pass therethrough to reach the right eye RE. As a result, parallax may be formed in an image.

The specific arrangement of the barriers 250a and the slits 250b of the barrier layer 250 will be described with reference to FIGS. 8A through 8D. FIGS. 8A through 8D illustrate plan views of exemplary arrangements of regions of the barrier layer 250 of FIG. 7.

Figure 8A:
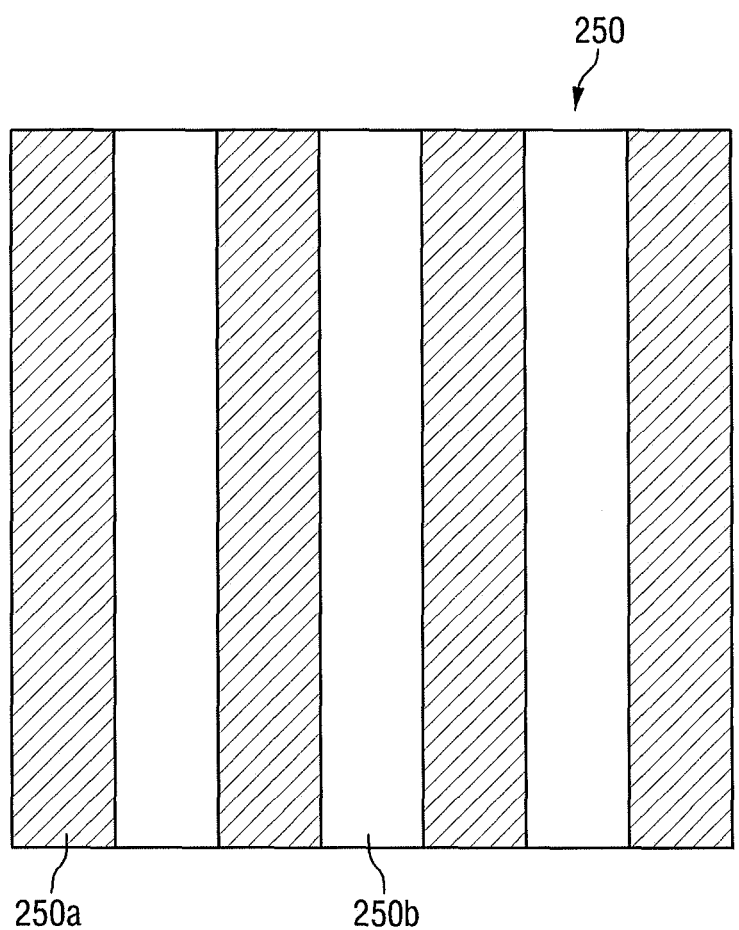
FIGS. 8A through 8D illustrate plan views showing example arrangements of regions of the barrier layer of FIG. 7.

In FIG. 8A, the barriers 250a, which block light, and the slits 250b, which transmit light, may be arranged in a horizontal direction in a vertical stripe form.

Figure 8B:
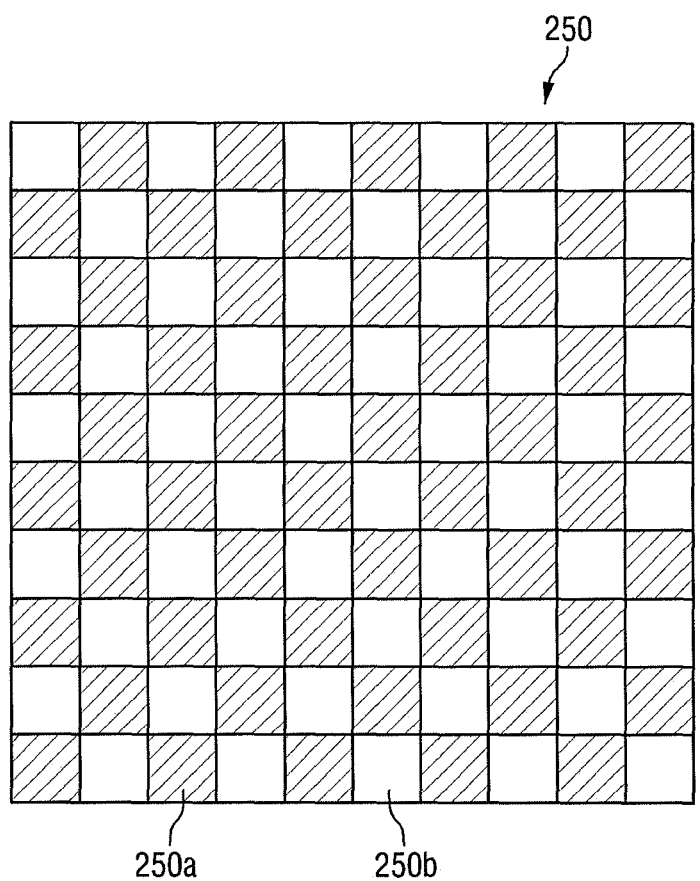

In FIG. 8B, the barriers 250a, which block light, and the slits 250b, which transmit light, may be arranged alternately in a matrix form.

Figure 8C:
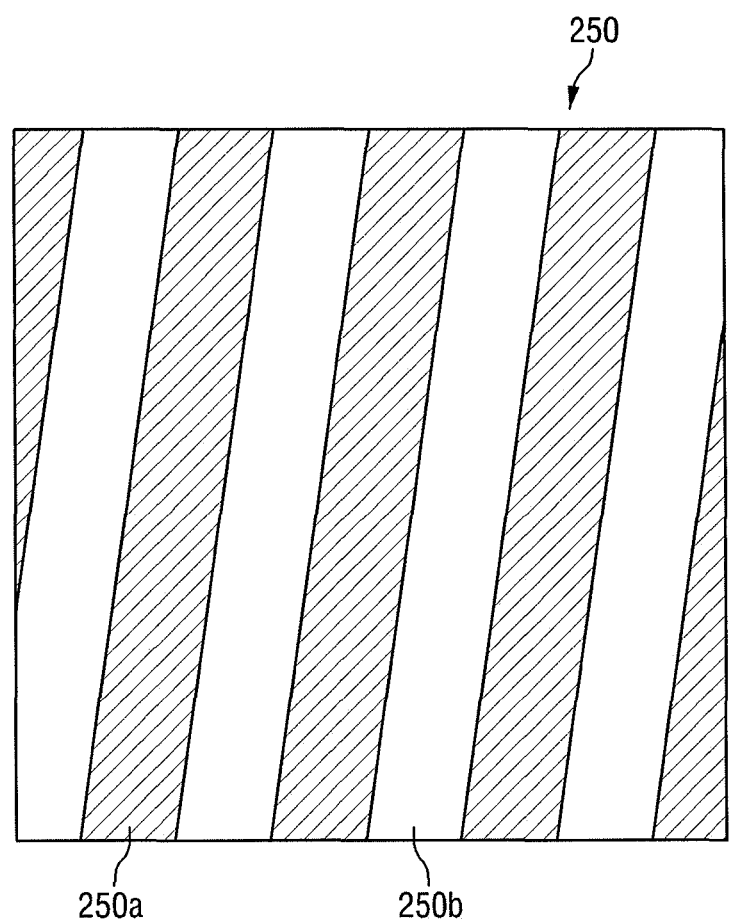

In FIG. 8C, the barriers 250a, which block light, and the slits 250b, which transmit light, may be arranged in the horizontal direction in a slanted stripe form.

Figure 8D:
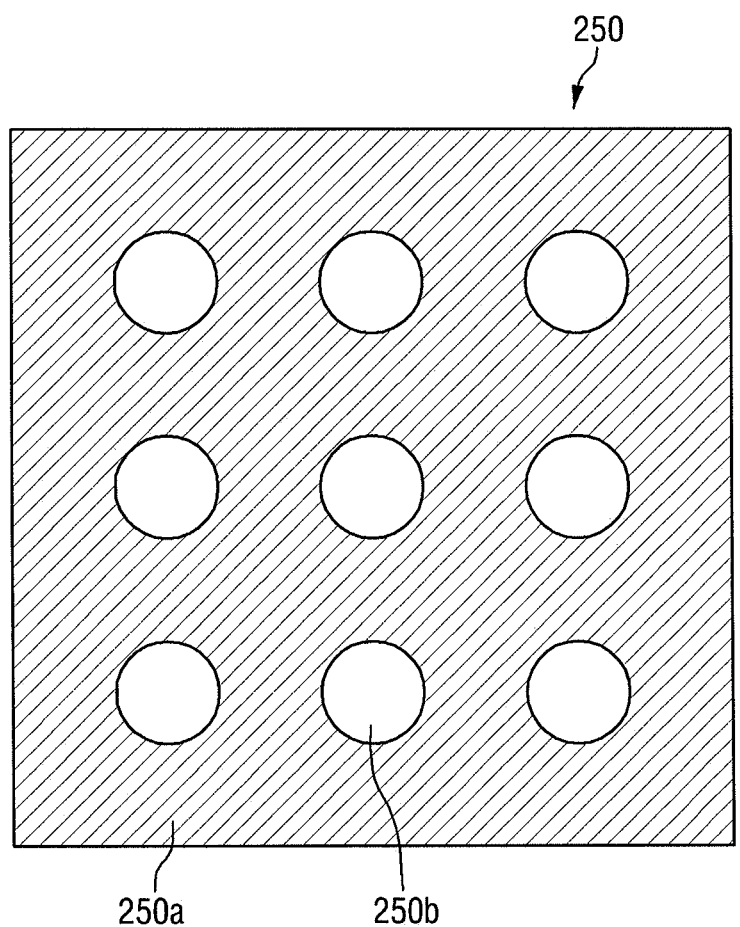

In FIG. 8D, the barriers 250a, which block light, and the slits 250b, which transmit light, may be arranged to form pinholes.

The arrangements of the barriers 250a and the slits 250b of the barrier layer 250 shown in FIGS. 8A through 8D are mere examples. To form a 3D stereoscopic image, the arrangement of the barriers 250a and the slits 250b may be changed by appropriately patterning the first electrode 210 and the second electrode 290.

Figure 9:
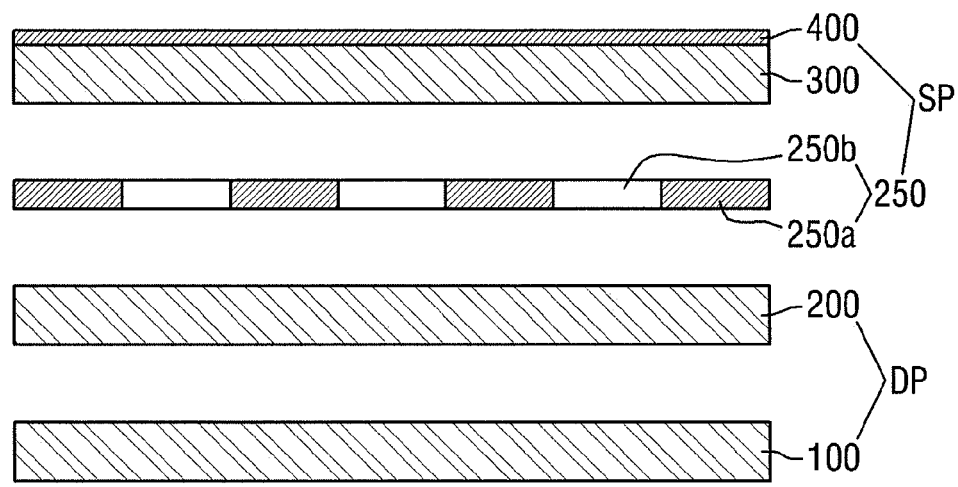
FIG. 9 illustrates a cross-sectional view showing the configuration of a display device according to another embodiment.
Figure 10:
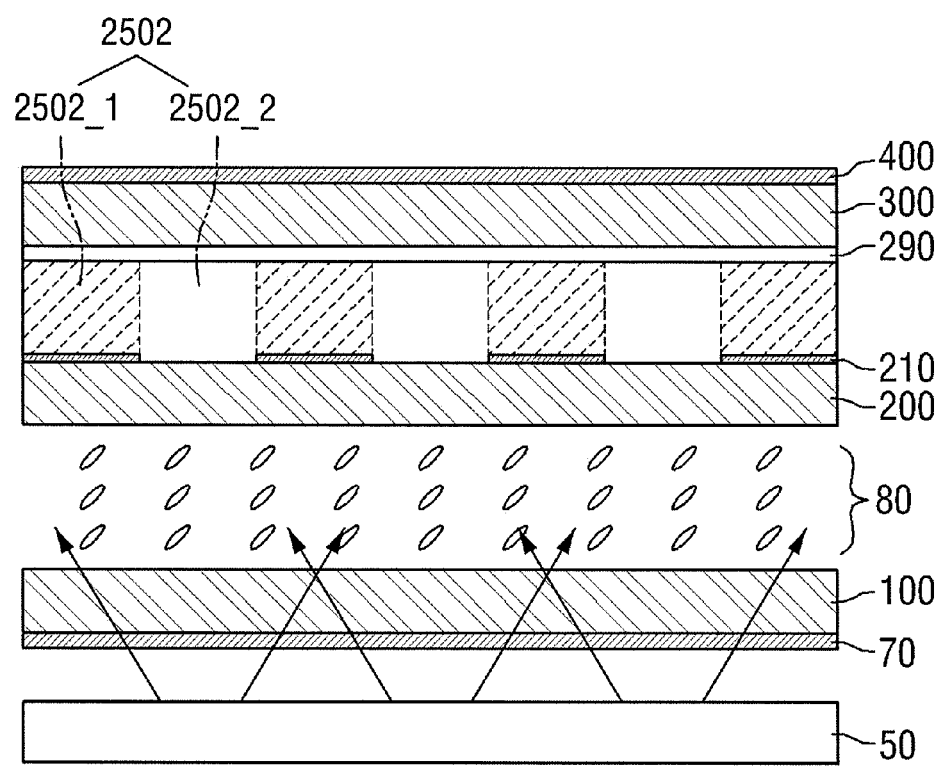
FIG. 10 illustrates a cross-sectional view showing a detailed configuration of the display device of FIG. 9.

Hereinafter, a display device according to another embodiment will be described with reference to FIGS. 9 and 10. FIG. 9 illustrates a cross-sectional view of the configuration of a display device, according to another embodiment. FIG. 10 illustrates a cross-sectional view of a detailed configuration of the display device of FIG. 9.

Referring to FIG. 9, the display device according to the current embodiment may include a display panel DP and a switching panel SP.

Each pixel of the display panel DP may generate light to form an image, and the switching panel SP may selectively transmit or block light generated from right-eye pixels and light emitted from left-eye pixels, thereby causing an observer to perceive a virtual 3D stereoscopic image. As described above, the switching panel SP may switch to a first mode or a second mode. Accordingly, the switching panel SP may transmit all light to display a 2D image or selectively transmit and block light to display a 3D image.

The display panel DP may include a first substrate 100 and a second substrate 200. The switching panel SP may include a barrier layer 250, a third substrate 300, and a first polarizing plate 400. In some embodiments, the display panel DP and the switching panel SP may share the second substrate 200, thereby reducing the number of substrates required. This configuration may enable the provision of a thin display device which can perform the same 2D/3D image display function as that of a conventional 2D/3D image display device.

The current embodiment is different from the previous embodiment in that the first polarizing plate 400 may not be formed under the second substrate 200 but is formed on the third substrate 300. For example, the display device according to the current embodiment may include the first substrate 100, the second substrate 200 which may be formed on the first substrate 100, have a first electrode 210 formed on a surface thereof and face the first substrate 100, the third substrate 300, which may face the second substrate 200 and have a second electrode 290 (facing the first electrode 210 and forming an electric field), the barrier layer 250 which may be interposed between the second substrate 200 and the third substrate 300 and may selectively control the transmission and blockage of light emitted from the pixels, and the first polarizing plate 400 which may be formed on the third substrate 300 and may transmit light having a first phase from light that passes through the barrier layer 250. The barrier layer 250 may include electrochromic elements which become colorless or black due to the electric field.

In FIG. 10, an LCD panel is used as an example of the display panel DP according to the current embodiment. A backlight assembly 50, which may include a plurality of light sources and a reflective plate, may be provided behind the display panel DP. A second polarizing plate 70 may be provided between the backlight assembly 50 and the first substrate 100. Light provided by the display panel DP may be incident on the switching panel SP. Since the detailed structure of the display panel DP has been described above in the previous embodiment, a repetitive description of identical components and configurations will be omitted.

An electric field may be formed in the switching panel SP by the first electrode 210 and the second electrode 290, and the switching panel SP may include electrochromic elements, which form a chromic barrier layer 2502. As described above in the previous embodiment, the first electrode 210 and/or the second electrode 290 may be patterned and formed on only part of the second substrate 200 and the third substrate 300, respectively. In addition, since an electric field may be formed only in a region in which an electrode is formed, the chromic barrier layer 2502 may be divided into first regions 2502_1 which block light and second regions 2502_2 which transmit light.

The first polarizing plate 400 may be situated on the third substrate 300. The switching panel SP according to the current embodiment may not include liquid crystal particles, which change the phase of light. Therefore, the phase of light incident on the switching panel SP may be the same as that of the light that passes through the switching panel SP. The first polarizing plate 400 may not, in advance, block or transmit all light may enter the switching panel SP, according to the phase of the light, as in the previous embodiment. Instead, the first polarizing plate 400 may block or transmit light which passes through the second regions 2502_2 of the chromic barrier layer 2502, after entering the switching panel SP, according to the phase of the light, thereby forming a desired image.

In some embodiments, the display panel DP may be an OLED display panel. In this case, the first polarizing plate 400, located on the third substrate 300 of the switching panel SP, may be omitted.

When the display panel DP is an LCD panel, the first polarizing plate 400 may block light having a phase that has been changed by a liquid crystal layer, such that each pixel may form an image. On the other hand, when the display panel DP is an OLED display panel, which may or may not emit light by itself, the first polarizing plate 400 for blocking light, according to the phase of the light, may be omitted.

The other elements of the display device are identical to those of the display device according to the previous embodiment, and thus a repetitive description thereof will be omitted.

Figure 11:
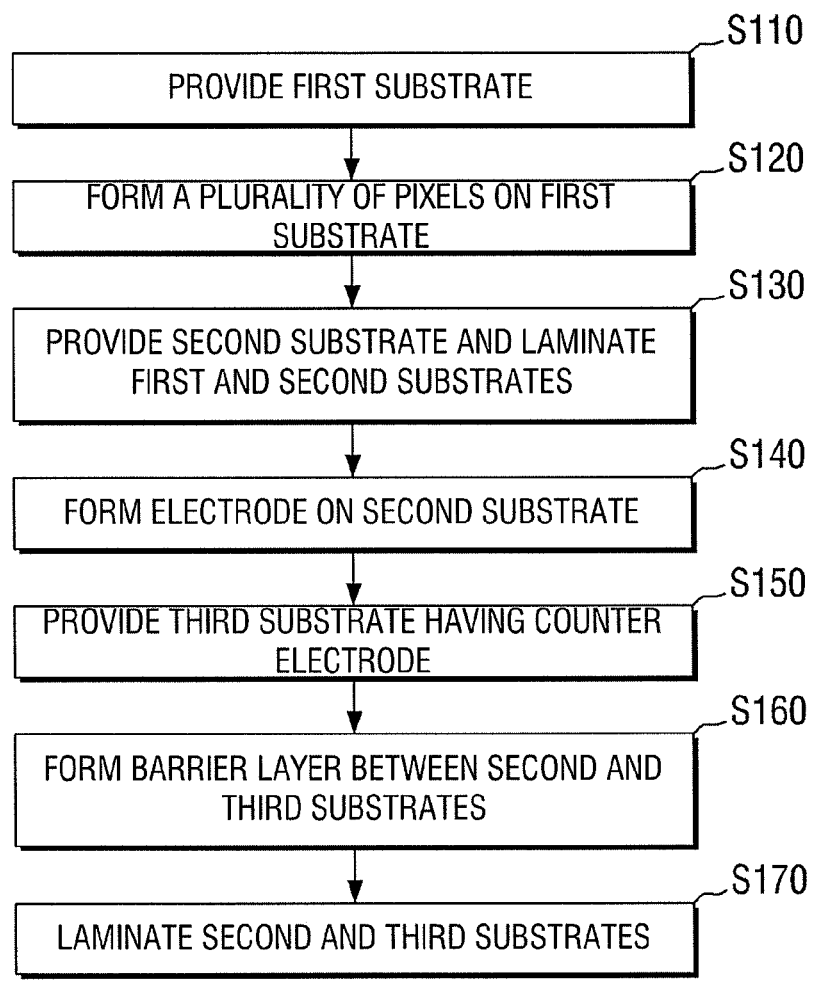
FIG. 11 illustrates a flowchart of a method of manufacturing a display device according to an embodiment.

Hereinafter, a method of manufacturing a display device according to an embodiment will be described. FIG. 11 illustrates a flowchart of a method of manufacturing a display device according to an embodiment.

The method of manufacturing a display device, according to the current embodiment, may include providing a first substrate (operation S110), forming a plurality of pixels, each including a pixel electrode, on the first substrate (operation S120), providing a second substrate, which faces the first substrate, and laminating the first substrate and a first surface of the second substrate (operation S130), forming a first electrode on a second surface of the second substrate (operation S140), providing a third substrate, which faces the second substrate and has a second electrode formed on a surface thereof to face the first electrode (operation S150), providing a barrier layer between the second substrate and the third substrate (operation S160), and laminating the second surface of the second substrate and a surface of the third substrate (operation S170). The barrier layer may include electrochromic elements, which may become colorless or black due to the electric field.

Specifically, a first substrate may be provided (operation S110). As described above, the first substrate may include a transparent glass material including $SiO_2$ as a main component. Alternatively, the first substrate may include transparent plastic.

A plurality of pixels, each including a pixel electrode, may be formed on the first substrate (operation S120). The first substrate and a second substrate may form a display panel, and a plurality of elements of the display panel may be formed on the first substrate. For example, when the display panel is an OLED display panel, a buffer layer, a first semiconductor layer, a gate insulating film, a gate electrode, an interlayer insulating film, source/drain electrodes, and a pixel defined layer may be sequentially stacked on the first substrate.

On the other hand, when the display panel is an LCD panel, a plurality of light sources, a reflective plate and a polarizing plate may be provided under the first substrate, one or more TFTs and/or one or more capacitors may be formed on the first substrate, and a liquid crystal layer may be formed between the first substrate and the second substrate.

The second substrate, facing the first substrate may be provided, and the first substrate and a first surface of the second substrate may be laminated together (operation S130). In the method of manufacturing a display device according to the current embodiment, a plurality of substrates may be laminated and stacked. In particular, the first and second substrates, which may form the display panel, may be laminated first.

A first electrode may be formed on a second surface of the second substrate (operation S140), and a third substrate, which may face the second substrate and may have a second electrode formed on a surface thereof, may be provided (operation S150). The second surface of the second substrate may be a surface that is opposite the first surface and does not face the first substrate. The first electrode and the second electrode form an electric field, thereby controlling the light transmittance, phase change or refractive index of each region of a barrier layer.

The barrier layer may be provided between the second substrate and the third substrate (operation S160). The barrier layer may include electrochromic elements which may become colorless or black due to the electric field.

An electrochromic element, which may be located in a region in which an electric field is formed among a plurality of regions of the barrier layer, may change from colorless to black, thus blocking light. On the other hand, an electrochromic element, located in a region in which no electric field is formed, may remain colorless, thus transmitting light.

Examples of an electrochromic material that may form the barrier layer may include a viologen group-containing compound and a functional group-containing polymer compound. The functional group may include one or more of perfluorocyclobutan, a hydroxyl group, an amino group, an alkyl amino group, an aryl amino group, a heteroaryl amino group, a cyano group, an alkyl group, a cycloalkyl group, an alkoxy group, an aryl group, an aryl alkyl group, a heteroaryl group, and a heterocyclic group.

The barrier layer may include a mixture of first chromic elements, which become colorless due to an electric field and second chromic elements, which become black due to the electric field. In addition, the barrier layer may be physically divided into a plurality of regions, and the first chromic elements and the second chromic elements may be arranged alternately in the regions.

The providing of the barrier layer (operation S160) may include preparing a composition which includes electrochromic elements and coating the composition on the second substrate.

The second surface of the second substrate and a surface of the third substrate may be laminated together (operation S170). For example, the first electrode, formed on the second surface of the second substrate, and the second electrode, formed on a surface of the third substrate, may be aligned to face each other. Then, the first and second substrates may be laminated together. As a result, the first through third substrates may be sequentially laminated.

The barrier layer may include first regions and second regions. The first and second regions may be arranged alternately in a matrix, and the first and second electrodes may be formed only at positions corresponding to the first or second regions to selectively change the color of the electrochromic elements located in the first regions of the barrier layer.

Here, when the first regions become black, they may function as barriers which block light, and the second regions may function as slits which transmit light.

By way of summation and review, research has been conducted on a stereoscopic image display device that may display a three-dimensional (3D) image by controlling an optical path. A polarized method (i.e., a glasses method), a time-division method, a parallax-barrier method (i.e., a glasses-less method), a lenticular or microlens method, and a blinking light method are mostly being researched.

In particular, in the parallax-barrier method, which is a method of forming a virtual 3D image using a stereoscopic image, vertical or horizontal slits are placed in front of images corresponding to left and right eyes. Therefore, the left and right eyes see different sub-images of a stereoscopic image synthesized through the slits, thus experiencing the 3D effect.

Watching only 3D images for a long time could cause a viewer to feel dizzy. In addition, the viewer may want to watch not only 3D image contents but also two-dimensional (2D) image contents. Accordingly, there is an increasing demand for switchable display devices, which can display either 2D or 3D images as desired by a user.

A display device using the parallax-barrier method to form a 3D stereoscopic image is thicker than a 2D image display device, since a switching module including a plurality of polarizing plates and a plurality of substrates is stacked on a liquid crystal or organic light-emitting panel. In addition, since a number of expensive polarizing plates are used, there is a limit to reducing production costs.

In contrast, the embodiments may provide at least one of the advantages set forth herein. For example, a display device according to embodiments may switch between a first mode for displaying 2D images, and a second mode for displaying 3D images, and may display both 2D and 3D images. One or more embodiments may provide a display device structured to display both two-dimensional (2D) and three-dimensional (3D) images using a reduced number of substrates and polarizing plates.

In addition, some of a plurality of substrates and a plurality of polarizing plates disposed on and under a barrier layer may be omitted. This enables the provision of a thinner display device which may perform the same 2D/3D image display function as that of a conventional 2D/3D image display device.

However, the effects of the embodiments are not restricted to the one set forth herein. The above and other effects of the embodiments will become more apparent to one of ordinary skill in the art to which the present invention pertains by referencing the claims.

In concluding the detailed description, those skilled in the art will appreciate that many variations and modifications can be made to the preferred embodiments without substantially departing from the principles of the embodiments. Therefore, the disclosed preferred embodiments of the invention are used in a generic and descriptive sense only and not for purposes of limitation.

What is claimed is:

1. A display device, comprising:
a first substrate;
a second substrate facing the first substrate, the second substrate having a first electrode on a surface thereof;
an organic light-emitting layer between the first substrate and the second substrate;
a first polarizing plate between the first and second substrates, and configured to transmit light having a first phase;
a third substrate on the second substrate and facing the second substrate, the third substrate having a second electrode facing the first electrode, and configured to form an electric field between the first electrode and the second electrode; and
a barrier layer interposed between the second substrate and the third substrate, the barrier layer configured to selectively control transmission and blockage of light emitted from a plurality of pixels on the first substrate.

2. The display device of claim 1, wherein the first polarizing plate overlaps the pixels on the first substrate.

3. The display device of claim 1, wherein the first polarizing plate is integrally attached to a surface of the second substrate.

4. The display device of claim 1, wherein the barrier layer includes a second liquid crystal layer, the second liquid crystal layer being driven by the electric field.

5. The display device of claim 4, further comprising a third polarizing plate disposed on the third substrate, the third polarizing plate being configured to transmit light a portion of light passing through the barrier layer, the portion of light having a third phase.

6. The display device of claim 1, wherein the barrier layer includes electrochromic elements, the electrochromic elements configured to become colorless or black due to the electric field.

7. The display device of claim 6, wherein the electrochromic elements include a functional group-containing polymer compound, wherein the functional group includes one or more of perfluorocyclobutan, a hydroxyl group, an amino group, an alkyl amino group, an aryl amino group, a heteroaryl amino group, a cyano group, an alkyl group, a cycloalkyl group, an alkoxy group, an aryl group, an aryl alkyl group, a heteroaryl group, and a heterocyclic group.

8. The display device of claim 1, wherein a configuration of the barrier layer in a first mode, in which incident light is transmitted, is different from a second mode, in which part of incident light is blocked.

9. A display device comprising:
a first substrate;
a second substrate on the first substrate and facing the first substrate, the second substrate having a first electrode on a surface thereof;
a third substrate on the second substrate and facing the second substrate, the third substrate having a second electrode on a surface thereof, the second electrode facing the first electrode and configured to form an electric field between the first electrode and the second electrode;

a barrier layer interposed between the second substrate and the third substrate, the barrier layer being configured to selectively control transmission and blockage of light in regions thereof corresponding to each of a plurality of pixels; and a first polarizing plate on the third substrate, the first polarizing plate configured to transmit a portion of light passing through the barrier layer, the portion of light having a first phase, the barrier layer including electrochromic elements, the electrochromic elements configured to become colorless or black by the electric field.

10. The display device of claim 9, further comprising:
a first liquid crystal layer provided between the first substrate and the second substrate; and
a second polarizing plate disposed under the first substrate and configured to transmit a portion of light emitted from a light source, the portion of light having a second phase.

11. The display device of claim 9, further including an organic light-emitting layer between the first substrate and the second substrate.

12. The display device of claim 9, wherein the barrier layer includes first chromic elements, the first chromic elements configured to become colorless due to the electric field, and second chromic elements, the second chromic elements configured to become black due to the electric field, the first and second chromic elements being arranged alternately in a matrix.

13. The display device of claim 9, wherein the barrier layer includes first regions and second regions, the first and second regions being arranged alternately in a matrix, and the first electrode and the second electrode being at positions corresponding to the first regions to selectively change the color of electrochromic elements in the first regions.

14. The display device of claim 13, wherein the first regions become black.

15. The display device of claim 9, wherein the electrochromic elements include a functional group-containing polymer compound, wherein the functional group includes one or more of perfluorocyclobutan, a hydroxyl group, an amino group, an alkyl amino group, an aryl amino group, a heteroaryl amino group, a cyano group, an alkyl group, a cycloalkyl group, an alkoxy group, an aryl group, an aryl alkyl group, a heteroaryl group, and a heterocyclic group.

16. The display device of claim 9, wherein a configuration of the barrier layer in a first mode, in which incident light is transmitted, is different from a second mode, in which part of incident light is blocked.

17. A method of manufacturing a display device, the method comprising:
providing a first substrate;
forming a plurality of pixels on the first substrate, each of the plurality of pixels including a pixel electrode;
providing a second substrate facing the first substrate;
laminating the first substrate and a first surface of the second substrate;
forming a first electrode on a second surface of the second substrate;
providing a third substrate facing the second substrate and having a second electrode on a surface thereof, the second electrode facing the first electrode;
providing a barrier layer between the second substrate and the third substrate, the barrier layer including electrochromic elements, the electrochromic elements becoming colorless or black due to the electric field; and
laminating the second surface of the second substrate and a surface of the third substrate.

18. The method of claim 17, wherein the barrier layer includes first regions and second regions, the first and second regions being arranged alternately in a matrix, and the first electrode and the second electrode being formed at positions corresponding to the first regions to selectively change the color of electrochromic elements in the first regions of the barrier layer.

19. The method of claim 18, wherein the first regions become black.

* * * * *